US007953166B2

(12) United States Patent
Grob-Lipski et al.

(10) Patent No.: US 7,953,166 B2
(45) Date of Patent: May 31, 2011

(54) METHOD OF PERFORMING RESOURCE ALLOCATION, BASE STATION, CENTRAL NODE, AND COMPUTER PROGRAM PRODUCT FOR OFDM TRANSMISSION

(75) Inventors: Heidrun Grob-Lipski, Starzach (DE); Christian Georg Gerlach, Ditzingen (DE)

(73) Assignee: Alcatel Lucent, Paris (FR)

( * ) Notice: Subject to any disclaimer, the term of this patent is extended or adjusted under 35 U.S.C. 154(b) by 964 days.

(21) Appl. No.: 11/747,217

(22) Filed: May 10, 2007

(65) Prior Publication Data

US 2007/0263580 A1 Nov. 15, 2007

(30) Foreign Application Priority Data

May 12, 2006 (EP) .................................. 06290781

(51) Int. Cl.
*H04K 1/10* (2006.01)
*H04L 27/28* (2006.01)
(52) U.S. Cl. ......... 375/260; 375/267; 370/204; 370/208
(58) Field of Classification Search .................. 375/260, 375/267; 370/203–211
See application file for complete search history.

(56) References Cited

U.S. PATENT DOCUMENTS

| 2002/0196840 A1* | 12/2002 | Anderson et al. | 375/130 |
| 2004/0127223 A1* | 7/2004 | Li et al. | 455/446 |
| 2005/0233752 A1* | 10/2005 | Laroia et al. | 455/450 |
| 2006/0183495 A1* | 8/2006 | Soliman | 455/522 |
| 2006/0293074 A1* | 12/2006 | Bottomley et al. | 455/522 |
| 2007/0049280 A1* | 3/2007 | Sambhwani et al. | 455/442 |
| 2007/0081449 A1* | 4/2007 | Khan | 370/208 |
| 2009/0042572 A1* | 2/2009 | Craig et al. | 455/436 |

* cited by examiner

*Primary Examiner* — Curtis B Odom
(74) *Attorney, Agent, or Firm* — Fay Sharpe LLP

(57) ABSTRACT

A method of performing resource allocation in OFDM transmission is disclosed. The method includes performing a partitioning of the OFDM spectrum into a number of predefined regions (Rij, R'ij) of sub-carriers (SCi) for a number of OFDM transmission cells, assigning at least one respective transmission-related characteristic to the regions of sub-carriers, and allocating the resources for communication with at least one user equipment in at least one region of sub-carriers based on the partitioning and dependent on the characteristic assigned to the regions of sub-carriers. This allows fast resource allocation with low signaling effort, as well as fast adjustment to changing system settings or changing systems conditions, while providing a possible alternative to costly handover procedures.

10 Claims, 8 Drawing Sheets

METHOD OF PERFORMING RESOURCE ALLOCATION, BASE STATION, CENTRAL NODE, AND COMPUTER PROGRAM PRODUCT FOR OFDM TRANSMISSION

BACKGROUND OF THE INVENTION

The invention is based on a priority application EP 06 290 781.1 which is hereby incorporated by reference.

The present invention relates to a method performing resource allocation in Orthogonal Frequency-Division Multiplexing (OFDM) transmission.

The present invention also relates to a base station and a central node as well as to a computer program product for a use in an OFDM transmission system.

In Frequency-Division Multiplexing (FDM), multiple signals are sent out at the same time, but on different frequencies. In OFDM, a single transmitter transmits on many (typically dozens to thousands) different orthogonal frequencies, i.e., frequencies that are independent with respect to a relative phase relationship between the frequencies. These frequencies are also referred to as sub-carriers, the totality of available sub-carriers forming an OFDM spectrum.

A (geographical) transmission area for OFDM transmission is subdivided into a number of OFDM transmission cells, each of them being served by a respective base station or NodeB. User equipments, e.g. mobile stations, present inside the OFDM transmission cells are allocated resources, i.e. sub-carriers, for communication inside the OFDM transmission system. Said allocation of resources is controlled by the base stations.

OBJECT OF THE INVENTION

It is the object of the present invention to provide a method of performing resource allocation in OFDM transmission which allows fast resource allocation with low signalling effort while permitting fast adjustment to changing system settings or changing system conditions. It is another object of the present invention to provide a base station, a central node and a computer program product for use in an OFDM transmission system capable of translating said method into practise.

SUMMARY OF THE INVENTION

According to a first aspect of the present invention the object is achieved by providing a method of performing resource allocation in OFDM transmission comprising the steps of:
- performing a partitioning of the OFDM spectrum into a number of predefined regions of sub-carriers for a number of OFDM transmission cells;
- assigning at least one respective transmission-related characteristic to said regions of sub-carriers; and
- allocating said resources for communication with at least one user equipment in at least one region of sub-carriers based on said partitioning and dependent on said characteristic assigned to said regions of sub-carriers.

According to a second aspect of the present invention, the object is achieved by providing a base station for use in an OFDM transmission system, comprising:
- means for receiving from a central node in said transmission system partitioning data descriptive of a partitioning of the OFDM spectrum into a number of predefined regions of sub-carriers for a number of OFDM transmission cells;
- means for receiving assignment data descriptive of an assignment of at least one respective transmission-related characteristic to said regions of sub-carriers;
- means for allocating said resources for communication with at least one user equipment in at least one region of sub-carriers based on the received data.

According to a third aspect of the present invention the object is further achieved by providing a central node for use in an OFDM transmission system comprising:
- means for generating partitioning data descriptive of a partitioning of the OFDM spectrum into a number of predefined regions of sub-carriers for a number of OFDM transmission cells;
- means for generating assignment data descriptive of an assignment of at least one respective transmission-related characteristic to said regions of sub-carriers; and
- means for transmitting the partitioning data and the assignment data to a number of base stations in the OFDM transmission system.

According to a fourth aspect of the present invention the object is achieved by a user equipment for use in an OFDM transmission system, comprising:
- means for receiving from a base station in said transmission system partitioning data descriptive of a partitioning of the OFDM spectrum into a number of predefined regions of sub-carriers for a number of OFDM transmission cells;
- means for receiving assignment data descriptive of an assignment of at least one respective transmission-related characteristic to said regions of sub-carriers.

Furthermore, according to a fifth aspect of the present invention the object is achieved by providing a computer program product for use in an OFDM transmission system, comprising program code sequences for implementing:
- means for receiving and/or for requesting from a central node in said transmission system partitioning data descriptive of partitioning of the OFDM spectrum into a number of predefined regions of sub-carriers for a number of OFDM transmission cells;
- means for receiving assignment data descriptive of assignment of at least one respective transmission-related characteristic to said regions of sub-carriers;
- means for allocating said resources for communication with at least one user equipment in at least one region of sub-carriers based on the received data;

when being executed on data processing means in a base station of the OFDM transmission system,
and/or for implementing:
- means for generating partitioning data descriptive of a partitioning of the OFDM spectrum into a number of predefined regions of sub-carriers for a number of OFDM transmission cells;
- means for generating assignment data descriptive of an assignment of at least one respective transmission-related characteristic to said regions of sub-carriers; and
- means for transmitting the partitioning data and the assignment data to a number of base stations in the OFDM transmission system;

when being executed on data processing means in a central node of the OFDM transmission system.

In addition to performing said portioning and/or generating/receiving related data based on a cell structure of an OFDM transmission system, further embodiments of the above-described various aspects of the present invention include performing said portioning and/or generating/receiving the related data for a predetermined number of consecutive OFDM symbols, i.e. for a predetermined amount of time.

In accordance with said first and second aspects of the present invention, resource allocation can be achieved either in uplink direction or in downlink direction. Therefore, in an embodiment of the method in accordance with the present invention the partitioning and/or the assigned characteristic is communicated to base stations in an OFDM transmission system and to user equipments in operative connection with said base stations. Alternatively or additionally, the partitioning and/or characteristic assignment is requested by an element, e.g. a base station or a user equipment of an OFDM transmission system.

For instance, in an embodiment of the base station in accordance with the invention, the latter comprises means for requesting in said transmission system, e.g. from a central node, partitioning data descriptive of a partitioning of the OFDM spectrum into a number of predefined regions of sub-carriers for a number of OFDM transmission cells. Alternative or additionally, the central node may comprise means for receiving requests from the base stations for transmitting the partitioning data and the assignment data to a number of base stations in the OFDM transmission system.

In an embodiment of the method in accordance with the present invention, the method further comprises the step of adapting a size and/or spectral location of at least one region. In this way, the present invention enables adaptable partitioning of the sub-carrier spectrum into regions with respective associated characteristics, e.g. power restrictions or the like.

Correspondingly, in a further embodiment of the method in accordance with the present invention the assigned characteristic is a transmit power restriction, particularly for interference coordination. Alternatively, a combination of different characteristics can be used. Additionally, a predefinition of resources in connection with distinguished allocation types, e.g. localized and/or distributed allocation, can be assigned, as described in a parallel patent application in the name of the present applicant/assignee (XXX title: "Method of performing resource allocation, base station, central node, and computer program product for OFDM transmission",applicant docket number 115032),the contents of which is herewith incorporated by reference into the present document.

In order to achieve low signalling effort, in a further embodiment of the method in accordance with the present invention the step of partitioning includes assigning equal sizes for all regions of sub-carriers.

In accordance with further embodiments of the inventive method, different adaptation modes are provided for to achieve a high degree of operational flexibility. In this way, in an embodiment of the method in accordance with the present invention, said method further comprises the step of repartitioning the OFDM spectrum for said number of OFDM transmission cells.

Alternatively or additionally, in another embodiment of the method in accordance with the present invention, said method further comprises the step of shifting assigned characteristics within at least one pair of transmission cells. Thus, a cell spanning (global) as well as a bilateral (cell-to-cell) adaptation mode is supported in accordance with the present invention. Said bilateral adaptation mode advantageously provides an alternative to costly handover procedures in conventional OFDM transmission systems.

However, in same cases it may be preferred to avoid shifting/changing of resources and/or characteristics, e.g. in the cases of fast mobile user equipments. In such cases, performing a handover may actually be preferred. To this end, in another embodiment of the method in accordance with the invention, a situation characterizing a user equipment in question, such as speed or fluctuating channel conditions, and/or a situation in a serving cell and in a handover-candidate cell on possible allocation adjustment or partitioning adjustment, is checked prior to taking a decision on handover and/or characteristic shifting. Additionally, in case a handover is performed the above-mentioned adjustment of allocation or partitioning can be performed. However, in case a characteristic shifting is decided instead of a handover said characteristic shifting can be performed instead.

In a corresponding embodiment of the base station in accordance with the present invention, said base station comprises means for deciding on a characteristic shifting request to/from at least one other base station.

In a corresponding embodiment of the central node in accordance with the present invention, said central node further comprises means for deciding on a characteristic shifting request between at least two base stations.

In a further embodiment of the method in accordance with the invention the step of partitioning, repartitioning, adapting and shifting can be performed based on certain predefined restrictions for at least some regions of sub-carriers, e.g. with respect to region sizes, locations, etc.

In the context of the present invention the inventive method enables flexible reaction to a plurality of possible adaptation scenarios, e.g. changing frequency planning, interference conditions, traffic conditions, geographical position, and channel quality, respectively.

In the context of interference coordination, in an embodiment of the method in accordance with the present invention the step of assigning the respective transmission-related characteristic involves assigning a first characteristic or a first combination of characteristics to a given region for a given transmission cell and assigning a second characteristic or a second combination of characteristics to a corresponding sub-carrier region for the other transmission cells from said number of transmission cells.

In a corresponding embodiment of the base station in accordance with the present invention, the latter further comprises
 means for transmitting and/or receiving an assigned characteristic shifting request to/from at least one other base station; and
 means for adapting at least one of said partitioning, assignment, and resource allocation in response to said request.

Further advantages and characteristics of the present invention can be gathered from the following description of preferred embodiments given by way of example only with reference to the enclosed drawings. Features mentioned above as well as below can be used in accordance with the invention either individually or in conjunction. The embodiments mentioned are not to be understood as an exhaustive enumeration but rather as examples with regard to the underlying concept of the present invention.

DETAILED DESCRIPTION

Figure 1:
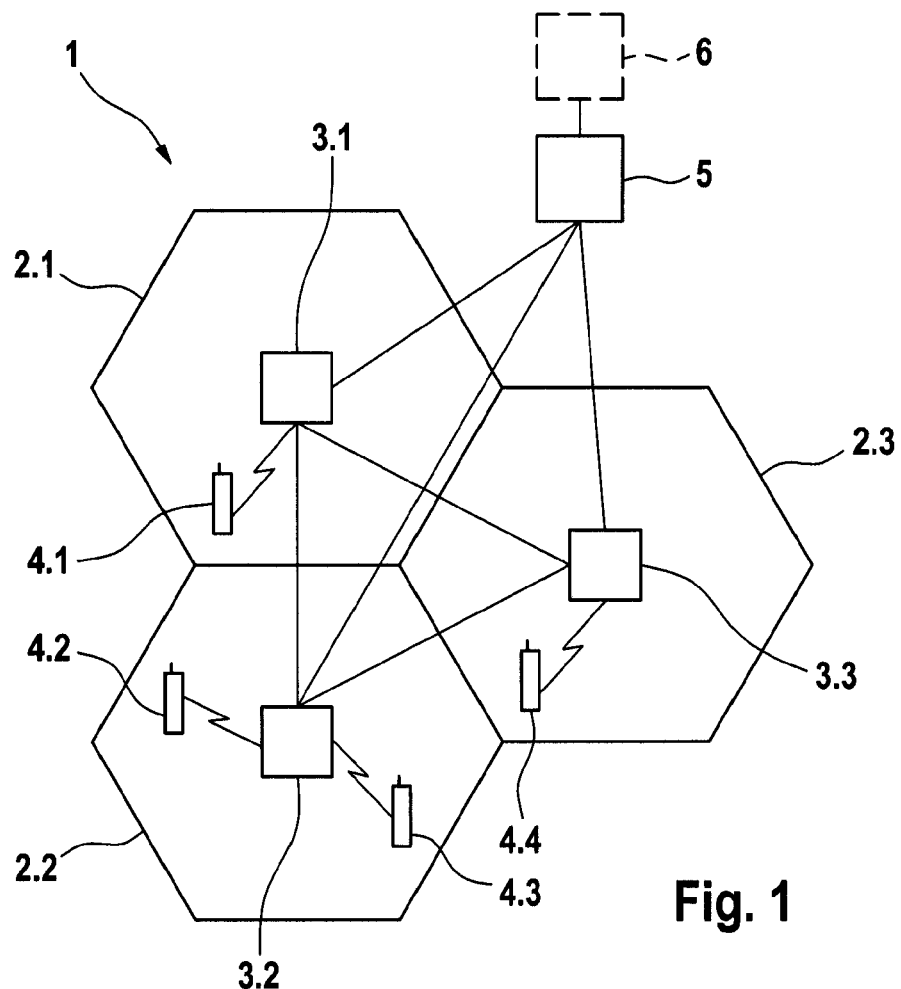
FIG. 1 is a schematic diagram of an OFDM transmission system.

FIG. 1 is a schematic diagram of an OFDM transmission system. The OFDM transmission system 1 comprises a number of OFDM transmission cells 2.1, 2.2, 2.3, only three of which are depicted for simplicity of illustration. Each of the transmission cells 2.1-2.3 comprises a respective base station or NodeB 3.1, 3.2, 3.3 for radio communication with number of end terminals (user equipments) 4.1-4.4 present in the respective transmission cell 2.1-2.3 associated with a given base station 3.1-3.3.

Base stations 3.1-3.3 are operatively connected for communicating among themselves. Furthermore, base stations 3.1-3.3 are connected with a hierarchically superior node or instance 5 of transmission system 1, herein also referred to as central node, Operation & Maintenance Node (O&M), or Operations Maintenance Center (OMC).

As indicated by means of dashed lines in FIG. 1, OMC 5 may be connected with an input device 6, e.g. in the form of a device for reading (magneto-)optical data carriers or a network interface device, for providing software in the form of program code sequences to the OMC 5 and/or to the base stations 3.1-3.3.

Communication between individual user equipments 4.1-4.4, e.g. mobile stations, occurs over radio links using Orthogonal Frequency-Division Multiplexing (OFDM), sometimes also referred to as Discrete Multitone Modulation (DMT), which is a transmission technique based upon the idea of Frequency-Division Multiplexing (FDM), wherein multiple signals are sent out at the same time, but on different frequencies. In OFDM a single transmitter, i.e. one of UEs 4.1-4.3 in FIG. 1, transmits on many (typically dozens to thousands) different orthogonal frequencies, i.e. frequencies that are independent with respect to the relative phase relationship between the frequencies. OFDM achieves high resistance of signals to interference.

Figure 2:
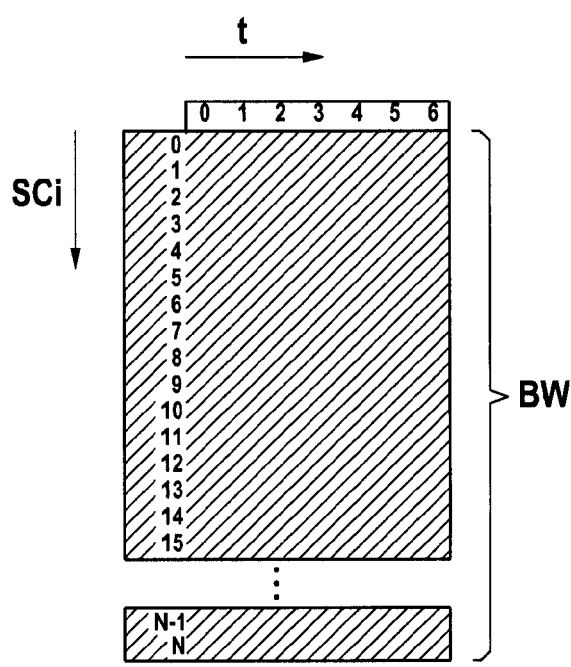
FIG. 2 is a schematic diagram illustrating bandwidth subdivision for OFDM transmission.

OFDM as such is known to a person skilled in the art. FIG. 2 is a schematic diagram illustrating bandwidth subdivision for OFDM transmission. In OFDM transmission, an available bandwidth BW is subdivided into a number N of individual sub-carriers, which are denoted SCi, i=0, . . . , N, in FIG. 2. The schematic diagram of FIG. 2 further includes a time coordinate t, such that based upon the diagram of FIG. 2 system resources (i.e., individual sub-carriers SCi or groups/blocks of sub-carriers) can be temporally allocated for communication of a given base station 3.1-3.3 (FIG. 1) with an associated user equipment 4.1-4.4 (FIG. 1), as known to a person skilled in the art.

Sub-carriers SCi in FIG. 2 generally experience different transmission qualities due to, e.g., interference or transmission paths with different qualities.

Figure 3:
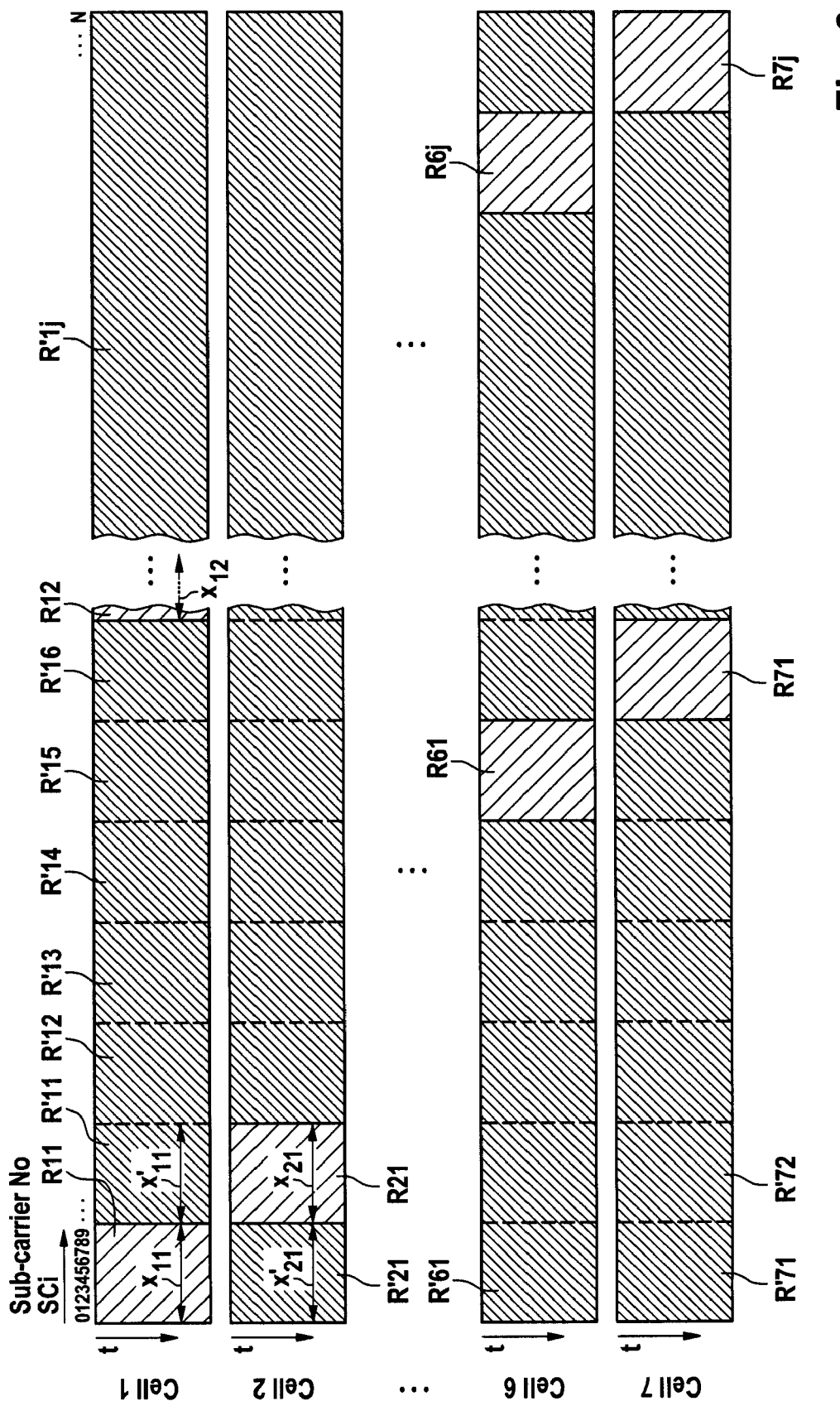
FIG. 3 is a schematic diagram of an exemplary partitioning of the OFDM spectrum in the method in accordance with the present invention.

FIG. 3 shows a schematic diagram of an exemplary partitioning of the OFDM spectrum in the method in accordance with the present invention. In contrast to the OFDM transmission system 1 of FIG. 1, the schematic diagram of FIG. 3 refers to a situation in which partitioning of the OFDM spectrum is performed for a number of seven OFDM transmission cells in analogy to cells 2.1-2.3 in FIG. 1. The diagram of FIG. 3 basically corresponds to the diagram of FIG. 2 for each of the cells. However, note that in FIG. 3 the horizontal axis SC and the vertical axis t have been flipped with respect to the diagram of FIG. 2.

According to FIG. 3 the OFDM spectrum in cell 1 (corresponding to any one of cells 2.1-2.3 in FIG. 1) is partitioned into a number of first type regions Rij (light shaded areas) and a number of second type regions R'ij (dark shaded areas) each extending over a respective number of sub-carriers, wherein i indicates the cell number and j indicates an ordering number for the occurrence of a given region type (R, R') within a given cell, e.g., R'12 denotes the second region of said second type in cell 1.

For instance, first type region R11 in cell 1 has a width $x_{11}$, which corresponds to or encompasses sub-carriers SC0 to SC9. Subsequent sub-carriers SCi (not individually numbered) belong to second type region R'11 having width $x'_{11}$ (calculated in units of number of sub-carriers), which generally need not be equal to width $x_{11}$. In a direction towards higher sub-carrier numbers, second type region R'11 of cell 1 is followed by further second type regions R'12-R'16 of equal widths $x'_{11}$ followed by another first type region R12 (not fully shown in FIG. 3) having width $x_{21}$ identical to the width of first type region R11, i.e. $x_{11}=x_{12}$. First type region R12 is again followed by second type regions R'1j (not individually shown), and so forth until reaching sub-carrier SCN.

Thus, in general there are (TCN−1) second type regions R'ij for every first type region Rij, wherein TCN signifies the total cell number, i.e. number of cell involved.

As can be gathered from FIG. 3, partitioning of cell 2 (corresponding to another one of cells 2.1-2.3 in FIG. 1) basically follows the same scheme as previously described with reference to cell 1. Cell 2 is partitioned according to a sequence of first and second type regions R2i, R'2j having respective widths $x_{2i}=x_{1i}$, $x'_{2j}=x'_{1j}$. However, in cell 2 first type region R21 being the first region of its type, i.e. the first type, does not start with sub-carrier SC0 but with sub-carrier SC10, i.e. SC0+$x_{11}$, as can be gathered from FIG. 3. In other words: first type region R21 of cell 2 is shifted by an amount of $x_{11}$ with respect to first type region R11 of cell 1. Provided that $x_{11}=x_{21}$ and $x'_{11}=x'_{21}$, as is the case in FIG. 3, the same holds for the other regions of cells 1 and 2 as well.

As can further be gathered from FIG. 3, the same partitioning scheme is continuously used for cells 3 (not shown) to 7, wherein for each cell i an initial first type region Ri1 is shifted by an amount $x_{(i-1)1}$ with respect to a start sub-carrier number SCj of an initial first type region R(i−1)1 of a preceding cell i−1.

Although it has proved advantageous in the context of the present invention, individual regions, in particular first type regions Rij, do not necessarily have to be of equal widths within a given cell and/or from one cell to another. In this way, partitioning of the OFDM spectrum in accordance with the present invention is not limited to the particular embodiment of FIG. 3.

As already stated above, for the example of FIG. 3 both $x_{ij}$ and $x'_{ij}$ have been chosen to be equal to 10, i.e. both first and second type regions comprise an equal number of 10 sub-carriers per region. Furthermore, an equal portion of sub-carriers per cell belongs to said first type regions Rij, said portion being equal to 1/7 (1/TCN) in the embodiment of FIG. 3. Assuming a total available number of sub-carriers N=560, this leads to a total number of 56 regions, wherein 56/7=8 regions are first type regions Rij (light shaded in FIG. 3) and 48 regions are second type regions R'ij (dark shaded in FIG. 3).

In accordance with embodiments of the present invention, said first and second type regions can be assigned at least one respective transmission-related characteristic, such that first and second type regions are mutually different from each other with respect to at least one such transmission-related characteristic, e.g. for achieving orthogonality for interference coordination. According to embodiments of the present invention, said distinctive transmission-related characteristic can be a transmit power restriction, e.g. for interference coordination. In other words, first type regions Rij are assigned a first transmit power, e.g. a relatively low transmit power, whereas second type regions R'ij are assigned a second transmit power, e.g. a relatively high (nominal) transmit power. In the case of interference coordination, the result of pre-structuring the OFDM spectrum is an orthogonal pattern, i.e., pre-structuring in one cell is orthogonal to the pre-structuring in other cells involved. This means that sub-carriers which are to be used with reduced power in said one cell may be used with nominal power in the other cells.

As can be gathered from the schematic diagram of FIG. 3, assigning the respective transmission-related characteristic involves assigning a first characteristic, e.g. low transmit power, to a given region, e.g. first type region, for a given transmission cell and assigning a second transmission-related characteristic, e.g. higher transmit power, to a corresponding region (having the same sub-carriers) for the other transmission cells.

Referring back to FIG. 1, in accordance with the embodiments of the present invention, partitioning data needed for performing the above-described partitioning into regions of the OFDM spectrum is generated by OMC 5 and transmitted to base stations 3.1-3.3 which actually perform the partitioning. In this context, said partitioning data can be stored in the OMC 5 and/or base stations 3.1-3.3 such that all of said elements of OFDM transmission system 1 have knowledge about the partitioning of the OFDM spectrum at all times.

The same holds for the assignment data needed for assigning said respective transmission-related characteristics to the partitioned regions of sub-carriers: according to embodiments of the invention said assignment data is generated by OMC 5 and then transmitted to the base stations 3.1-3.3 which actually perform the assignment. Furthermore, OMC 5 and/or base stations 3.1-3.3 can be adapted to store said assignment data, such that corresponding information is present at the above-mentioned elements of the OFDM transmission system 1 at all times.

Internal configuration of OMC 5 and base stations 3.1-3.3 in accordance with embodiments of the present invention will be described in further detail below with reference to appended FIGS. 7 to 10.

Figure 4:
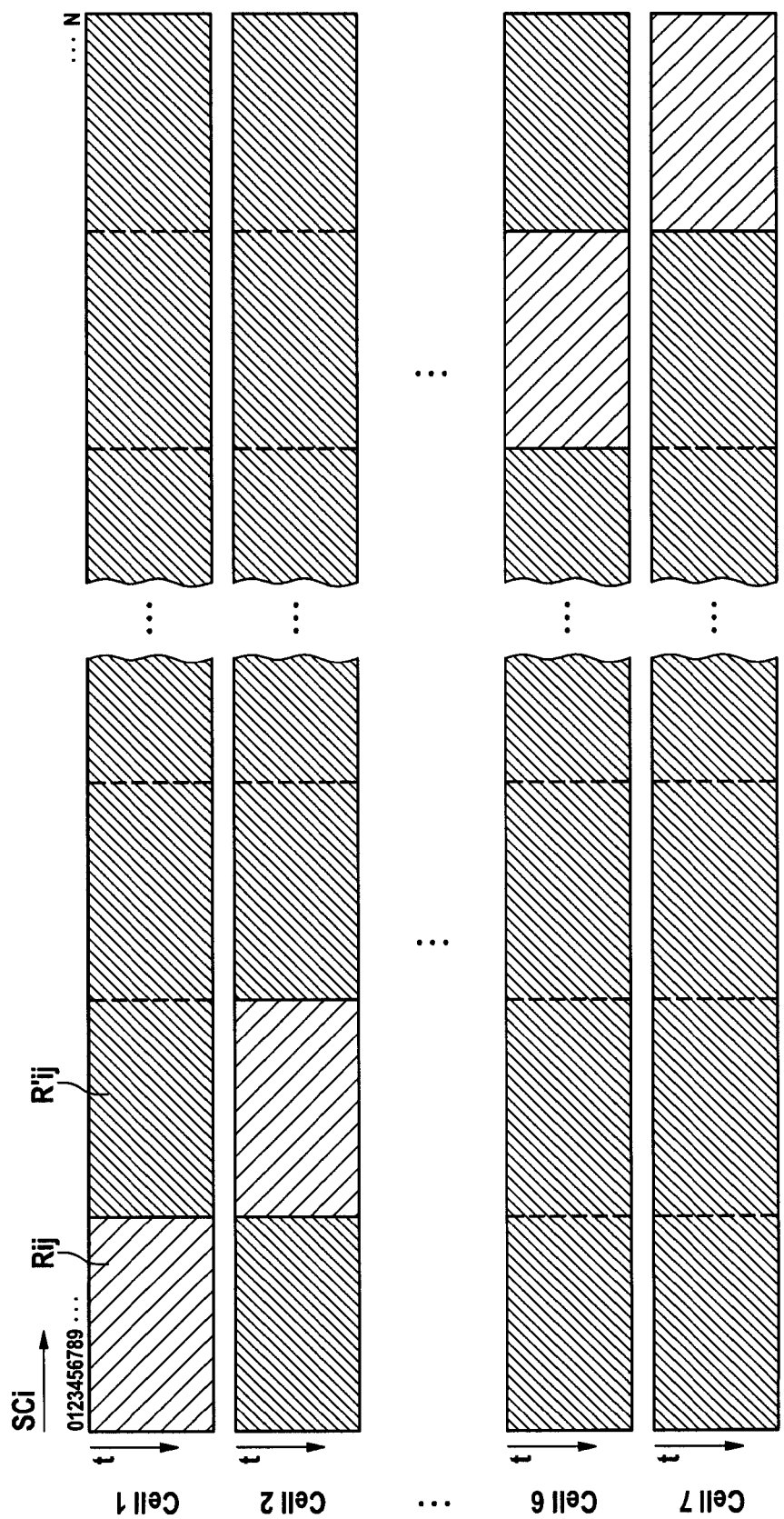
FIG. 4 is another schematic diagram of an exemplary partitioning of the OFDM spectrum in the method in accordance with the present invention.

FIG. 4 shows another schematic diagram of an exemplary partitioning of the OFDM spectrum in the method in accordance with the present invention. The schematic diagram of FIG. 4 basically corresponds to the illustration of FIG. 3, i.e. an equal portion of sub-carriers per cell belongs to first type regions Rij, said portion again being equal to 1/7. However, according to the embodiment of FIG. 4, each region Rij, R'ij now comprises 20 sub-carriers, which leads to a total number of 28 regions, wherein there are 4 first type regions Rij and 24 second type regions R'ij per cell.

Again, the regions are assigned respective translation-related characteristics and are shifted in the same way as previously described with reference to FIG. 3, such that a more detailed discussion of FIG. 4 can be omitted.

In the context of the present invention, the partitioning of FIG. 4 can be an adaptation of the partitioning according to FIG. 3. In other words, passing from FIG. 3 to FIG. 4 the equal number (10) of sub-carriers per region according to the embodiment of FIG. 3 has been adapted to another equal number (20) of sub-carriers per region according to FIG. 4.

As previously described, said adaptation of partitioning can be achieved by means of OMC 5 (FIG. 1) transmitting corresponding new partitioning and/or assignment data to base stations 3.1-3.3 for globally changing the partitioning of the OFDM spectrum, wherein transmission of said data may have been requested by at least one of the base stations. In this context, the term "globally" encompasses a predetermined number of cooperating transmission cells, e.g. cells 2.1-2.3 of FIG. 1 or cells 1 to 7 of FIG. 3, 4, generally any number of (neighbouring) cells in operative connection with a common central node or OMC 5 (FIG. 1).

Such an adaptation may be necessary due to changing traffic or load conditions requiring, e.g., extensive localised (blockwise) allocation of resources, which in turn requires larger first and/or second type partition regions.

Adaptation of the partitioning, as described above, can be initiated by OMC 5 (FIG. 1). Alternatively or additionally, adaptation of the partitioning can be initiated (requested) by any one of base stations 3.1-3.3 (FIG. 1) if one of the latter detects changing traffic/load conditions in its respective transmission cell 2.1-2.3 (FIG. 1).

The above-described adaptation of partitioning was performed on a global, i.e. cell-spanning, scale and involved adapting the partitioning in each of the cells 2.1-2.3 (FIG. 1). Referring to appended FIGS. 5, 6 a different way of adapting the partitioning in accordance with embodiments of the present invention will now be described, which is performed on a bilateral scale, i.e. involving only pairs of transmission cells 2.1-2.3.

For instance, due to changing radio or traffic conditions in a given OFDM transmission cell, said cell may ask neighbouring cells to "lend" or to "borrow" resources, e.g. for obviating costly handover procedures. However, said request may also lead to preferredly performing a handover, e.g. due to an excessively high speed of a involved mobile terminal and/or due to a lack of suitable resources for lending/borrowing in the neighbouring cells.

Figure 5:
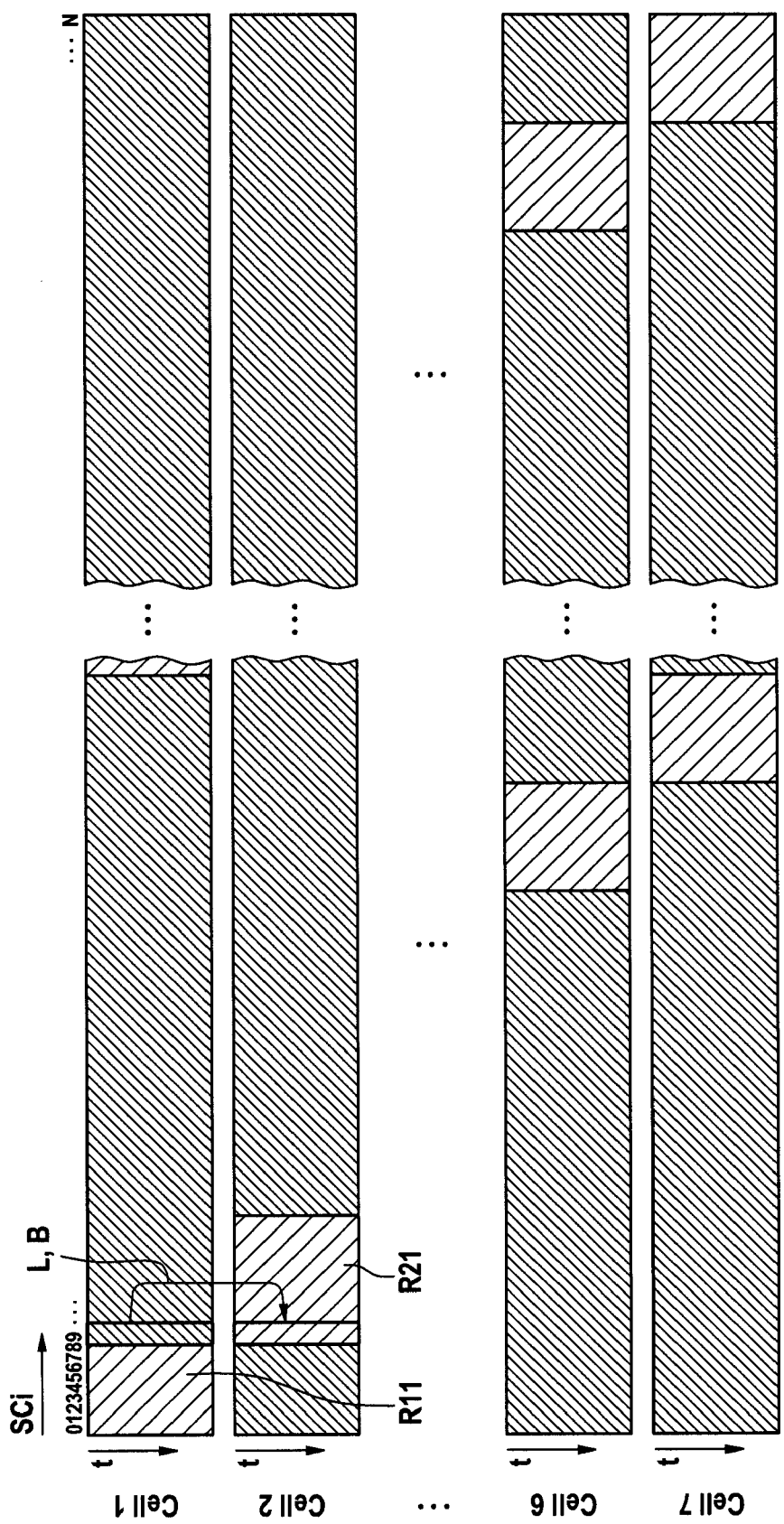
FIG. 5 is a schematic diagram illustrating adaptation of partitioning in accordance with the present invention.

FIG. 5 shows a schematic diagram illustrating adaptation of partitioning in accordance with the present invention. Initially, the situation depicted in FIG. 5 is identical to the partitioning situation described above with reference to FIG. 3. However, in contrast to the situation depicted in FIG. 3, according to FIG. 5 a cell, e.g. cell 1, asks a neighbour cell, e.g. cell 2, to borrow resources, e.g. sub-carriers SC8 and SC9 or a combination of sub-carriers. In other words, cell 1 of FIG. 5, which can be any one of cells 2.1-2.3 of FIG. 1, proposes sub-carriers SC8 and SC9 belonging to its initial first type region R11 for use by cell 2.

In the present context, the term "neighbour cells" refers to any pair of cells with mutually inter-dependent transmission conditions, e.g., due to geographical proximity or the like.

The above-described borrowing procedure is illustrated by means of arrow B in FIG. 5. Alternatively, cell 2 in FIG. 5, i.e. a corresponding base station or NodeB, may issue a request to the base station of cell 1 to lend resources, i.e. sub-carriers SC8 and SC9. This lending procedure is illustrated by means of arrow L in FIG. 5. As a result first type region R11 of cell 1 is reduced to sub-carriers SC0-SC7 (8 sub-carriers) whereas first type region R21 of cell 2 now comprises sub-carriers SC8-SC19 (12 sub-carriers).

Assuming that regions R11 and R21 of FIG. 5 are regions of reduced transmit power, this means that cell 2 now has additional resources (sub-carriers) for low power transmission, whereas cell 1 now has reduced low power transmission capacity. This kind of partition may be advantageous if cell 2 contains a relatively large number of mobile stations (user equipments) or has an elevated need for resources (large amount of user data) in a central spatial region of the transmission cell, such that low transmission power is preferably used for reason of interference coordination. Additionally or alternatively, cell 1 may have a relatively large number of mobile stations or an elevated need for resources (large amount of user data) in its outer spatial regions, such that an increased number of sub-carriers without transmit power limitation is needed in cell 1. Accordingly cell 1 would propose lending L of resources, whereas cell 2 would request borrowing B of resources, as previously described.

The above-described adaptation of partitioning may be performed entirely on a bilateral scale involving signalling traffic between corresponding base stations only. No cell-spanning repartitioning involving OMC 5 (FIG. 1) is required. In accordance with the embodiments of the present invention the base stations involved in the above-described adaptation process transmit and/or receive shifting requests (lending or borrowing) with respect to their assigned transmission-related characteristics to/from at least one other base station and adapt their partitioning in response to said request.

Figure 6:
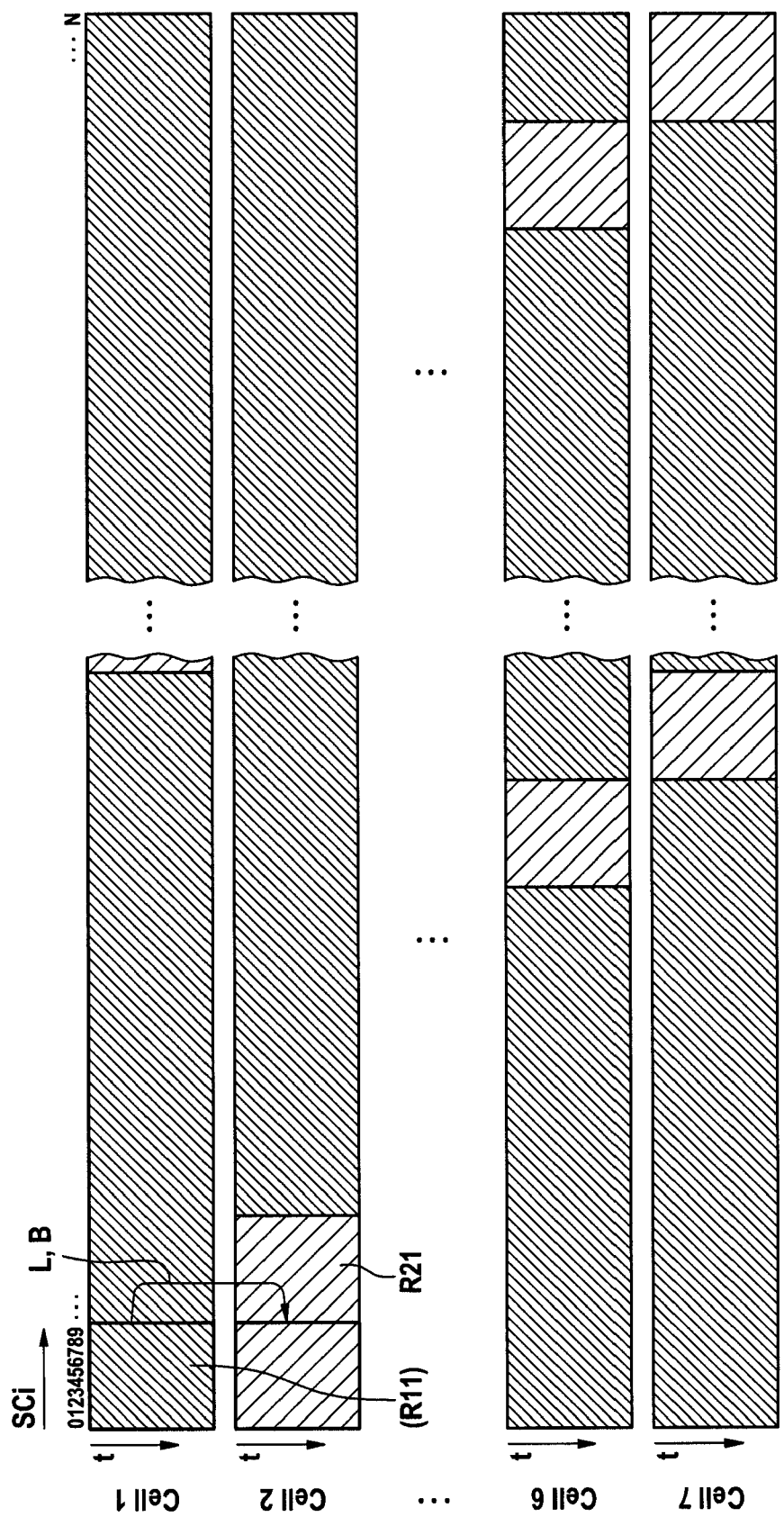
FIG. 6 is a schematic diagram of another adaptation of partitioning in accordance with the present invention.

FIG. 6 shows a schematic diagram illustrating adaptation of partitioning in accordance with the present invention. The initial partitioning configuration underlying FIG. 6 is identical to that described above with reference to FIG. 4. According to FIG. 6 cells 1 and 2, i.e. the corresponding base stations, exchange a shifting (lending or borrowing) request L, B involving shifting the entire initial first type region R11 of cell 1 to cell 2. In this way, cell 1 now comprises only 7 first type regions Rij, whereas cell 2 now comprises 9 first type regions Rij.

Again, in the case of FIG. 6, partitioning adaptation can be performed on a bilateral scale involving only the base stations of cell 1 and cell 2.

Figure 7:
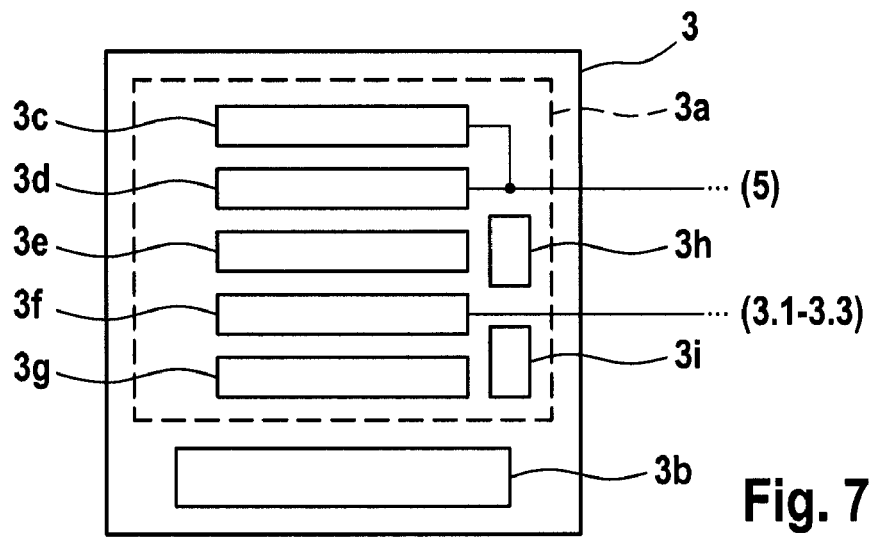
FIG. 7 is a schematic block diagram of a base station in accordance with the present invention.

FIG. 7 is a schematic block diagram of a base station in accordance with an embodiment of the present invention. For instance, base station 3 depicted in FIG. 7 can be identified with any one of base stations 3.1-3.3 of FIG. 1.

Base station 3 generally comprises data processing means 3a and storing means 3b. Within said data processing means 3a base station 3 further comprises first transceiving means 3c, receiving means 3d, allocating means 3e, second transceiving means 3f, adapting means 3g, deciding means 3h, and checking means 3i. First transceiving means 3c and receiving means 3d are connected with central node 5 (FIG. 1), and second transceiving means 3f is connected with at least one other base station of base station 3.1-3.3 (FIG. 1).

As described to some extend farther up, first transreceiving means 3c are adapted for requesting and for receiving partitioning data descriptive of partitioning of the OFDM spectrum into the number of predefined regions of sub-carriers for a number of OFDM transmission cells from central node 5 (FIG. 1). Receiving means 3d are adapted for receiving assignment data descriptive of assignment of at least one respective transmission-related characteristic to said regions of sub-carriers. Allocating means 3e are adapted for allocating cell resources to at least one user equipment in at least one region of sub-carriers based on said partitioning and dependent on said characteristic assigned to said regions of sub-carriers. Second transceiving means 3f are adapted for transmitting and/or receiving an assigned characteristic shifting request to/from at least one other base station, and adapting means 3g are adapted for adapting at least one of said partitioning, assignment, and resource allocation in response to said request. Deciding means 3h are adapted to decide on a requested/proposed allocation adjustment or partitioning adjustment. Checking means 3i are adapted for checking a situation (in terms of traffic load, resource structure, etc.) in a serving cell and in a handover-candidate cell on possible allocation adjustment or partitioning adjustment, which is checked prior to taking a decision on handover and/or characteristic shifting, e.g., for commanding a handover in case of insufficient resources for lending/borrowing.

According to the embodiment of FIG. 7, means 3c-3i are preferably devised in software form, wherein corresponding program code sequences can be provided to base station 3 by means of input device 6 (FIG. 1) via OMC 5 (FIG. 1), as previously described.

First transceiving means 3c and receiving means 3d are connected with OMC 5 (FIG. 1) for requesting and receiving therefrom partitioning and assignment data, as also described above. Allocating means 3e then performs resource allocation in accordance with the present invention based on the data received from central node 5. Using second transceiving means 3f and adapting means 3g, base station 3 of FIG. 7 is enabled to carry out a bilateral partitioning adaptation in corporation with at least one other base station, as previously described with reference to FIGS. 5 and 6.

Allocating means 3e and/or adapting means 3g may further comprise calculating means (not shown) for calculating any kind of information required for performing partitioning and partitioning adaptation as depicted in FIGS. 3, 4 and FIGS. 5, 6, respectively, from the transmitted data received at first transceiving means 3c and receiving means 3d. Said information particularly includes positions of all first and second type regions for a corresponding transmission cell as well as the associated transmission-related characteristics.

Said information as well as any data received from OMC 5 (FIG. 1) is stored in storing means 3b in and is therefore present at the base station 3 at any time, which considerably reduces signalling effort required and enables fast resource allocation.

Figure 8:
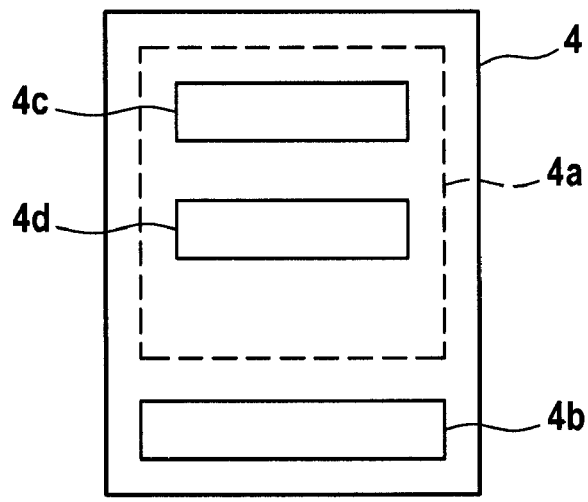
FIG. 8 is a schematic block diagram of a user equipment in accordance with the present invention.

FIG. 8 is a schematic block diagram of a user equipment 4, e.g. a mobile station, for use in an OFDM transmission system in accordance with an embodiment of the present invention. For instance, user equipment 4 depicted in FIG. 8 can be identified with any one of user equipments 4.1-4.4 of FIG. 1.

User equipment 4 of FIG. 8 generally comprises data processing means 4a and storing means 4b. Within data processing means 4a, user equipment 4 further comprises transceiving means 4c and checking means 4d.

Means 4c-4d are preferably devised in software form, wherein corresponding program code sequences can either be provided from central node 5 via base station 3 (FIG. 7) or can be installed directly on the user equipment.

Transceiving means 4c are adapted for receiving from a base station 3, 3.1-3.3 (FIG. 8) partitioning data descriptive of a partitioning of the OFDM spectrum into a number of predefined regions of sub-carriers for a number of OFDM transmission cells and consecutive OFDM symbols. Transceiving means 4c are also adapted for receiving assignment data descriptive of an assignment of at least one respective transmission-related characteristic to said regions of sub-carriers.

Furthermore, transceiving means 4e are adapted for requesting repartitioning data from any one of said base stations 3.1-3.3 and/or central node 5, as described above. Checking means 4d are adapted to determine a situation characterizing the user equipment in question, such as speed or fluctuating channel conditions, and/or a situation in a serving cell and in a handover-candidate cell with respect to possible allocation adjustment or partitioning adjustment, prior to taking a decision on handover and/or characteristic shifting. Preferably, situation determination results are communicated to one of said base stations 3.1-3.3 and/or central node 5 through transceiving means 4c for deciding on handover vs. allocation/partitioning adjustment, respectively.

Data generated at user equipment 4 is stored in storing means 4b and is therefore available at any time.

Figure 9:
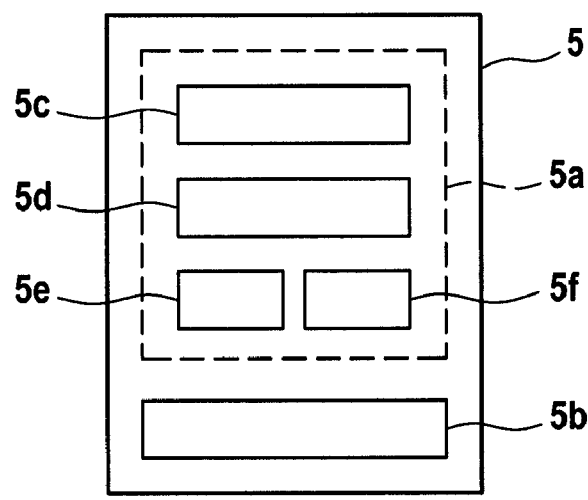
FIG. 9 is a schematic block diagram of a central node in accordance with the present invention.

FIG. 9 is a schematic block diagram of a central node for use in an OFDM transmission system in accordance with an embodiment of the present invention. Central node 5 of FIG. 9 generally comprises data processing means 5a and storing means 5b. Within data processing means 5a, central node 5 further comprises partitioning data generating means 5c, assignment data generating means 5d, transceiving means 5e, and deciding means 5f.

Means 5c-5f are preferably devised in software form, wherein corresponding program code sequences can be provided to central node 5 by means of input device 6 (FIG. 1).

Partitioning data generating means 5c is adapted for generating partitioning data descriptive of partitioning of the OFDM spectrum into a number of predefined regions of sub-carriers for a number of OFDM transmission cells. Assignment data generating means 5d is adapted for generating assignment data descriptive of assignment of at least one respective transmission-related characteristic to said regions of sub-carriers. Transceiving means 5e is adapted for transmitting the partition data and the assignment data to a number of base stations 3.1-3.3 (FIG. 1) in the OFDM transmission system 1 (FIG. 1). The transceiving means 5e is further adapted for receiving requests for repartitioning from any one of said base stations 3.1-3.3. Deciding means 5f are adapted to decide on a requested/proposed allocation adjustment or partitioning adjustment, as previously described.

Data generated at central node 5 is stored in storing means 5b and is therefore available at any time.

Operation of the above-described OFDM transmission system 1 (FIG. 1) comprising central node 5 of FIG. 9 as well as a number of base stations similar to base station 3 of FIG. 7 and a number of user equipments similar to user equipment 4 of FIG. 8 will now be described with reference to appended FIGS. 10 and 11, in particular with respect to a method of performing resource allocation to user equipment in OFDM transmission in accordance with embodiments of the present invention.

Figure 10:
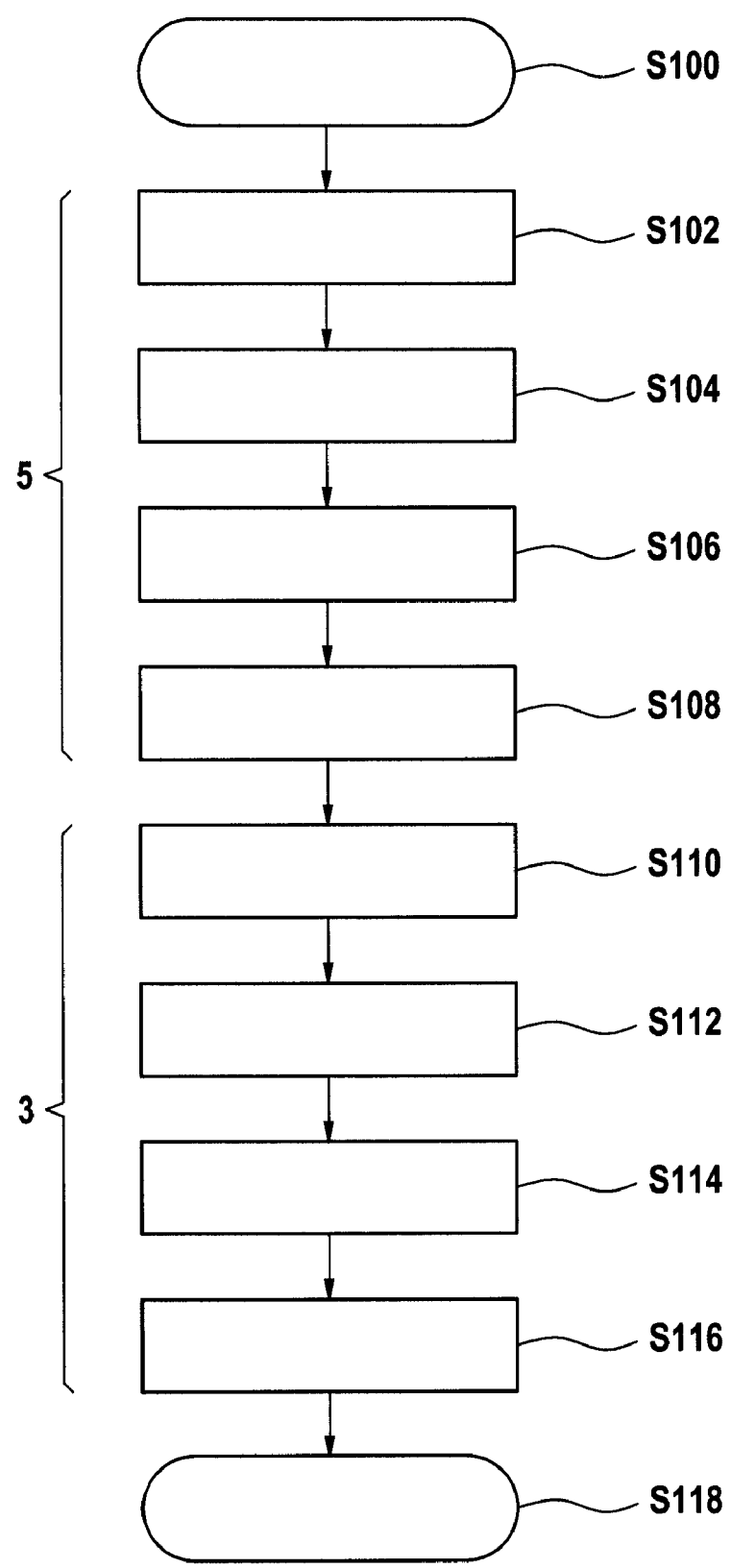
FIG. 10 is a flow chart of a first signalling flow in connection with a method in accordance with the present invention.

FIG. 10 is a flow chart of a first signalling flow in connection with a method in accordance with the present invention. Prior to starting the method in step S100, it is assumed that system type information comprising a total number of available sub-carriers and positions of control channels within the available OFDM spectrum (not depicted in FIGS. 3 to 6) are known to OMC 5 and/or base stations 3.1-3.3. Said system type information may further comprise additional information such as a predetermined amount of power restriction for low transmit power regions or the like.

In step S102 OMC 5 broadcasts information concerning the number of sub-carriers for first type regions Rij, e.g. 10 for the example of FIGS. 3, 5 and 6. In subsequent step S104 OMC 5 broadcasts information concerning the position of the initial first type region Ri1 for all cells 2.1-2.3 (FIG. 1), e.g. sub-carrier SC0 for cell 1, sub-carrier SC10 for cell 2, ..., sub-carrier SC60 for cell 7 (cf. FIG. 3). Then, in step S106 OMC 5 broadcasts information concerning the distance between first type regions, e.g. 60 in the case of FIG. 3. Finally, in step S108 OMC 5 broadcasts information concerning at least one transmission-related characteristic to be assigned to said first type regions Rij of all cells, e.g. a transmit power restriction. In this context, the term "broadcast" signifies that corresponding information is sent from OMC 5 to every base station 3.1-3.3 of the OFDM transmission system 1 of FIG. 1.

Base stations 3.1-3.3 receive/store said broadcast information, i.e. the corresponding data, in step S10. In subsequent step S112 base stations 3.1-3.3 determine the positions of all first type regions Rij by means of said calculating means (not shown). In subsequent step S114 base stations 3.1-3.3 determine the positions of all second type regions R'ij. Then, in step S116 each region type is associated with at least one transmission-related characteristic, e.g. a power restriction, as already explained in detail above. The method terminates with step S118.

In FIG. 10, processes performed at/by means of the OMC 5 and individual base stations 3.1-3.3 have been marked "5" and "3", respectively.

Figure 11:
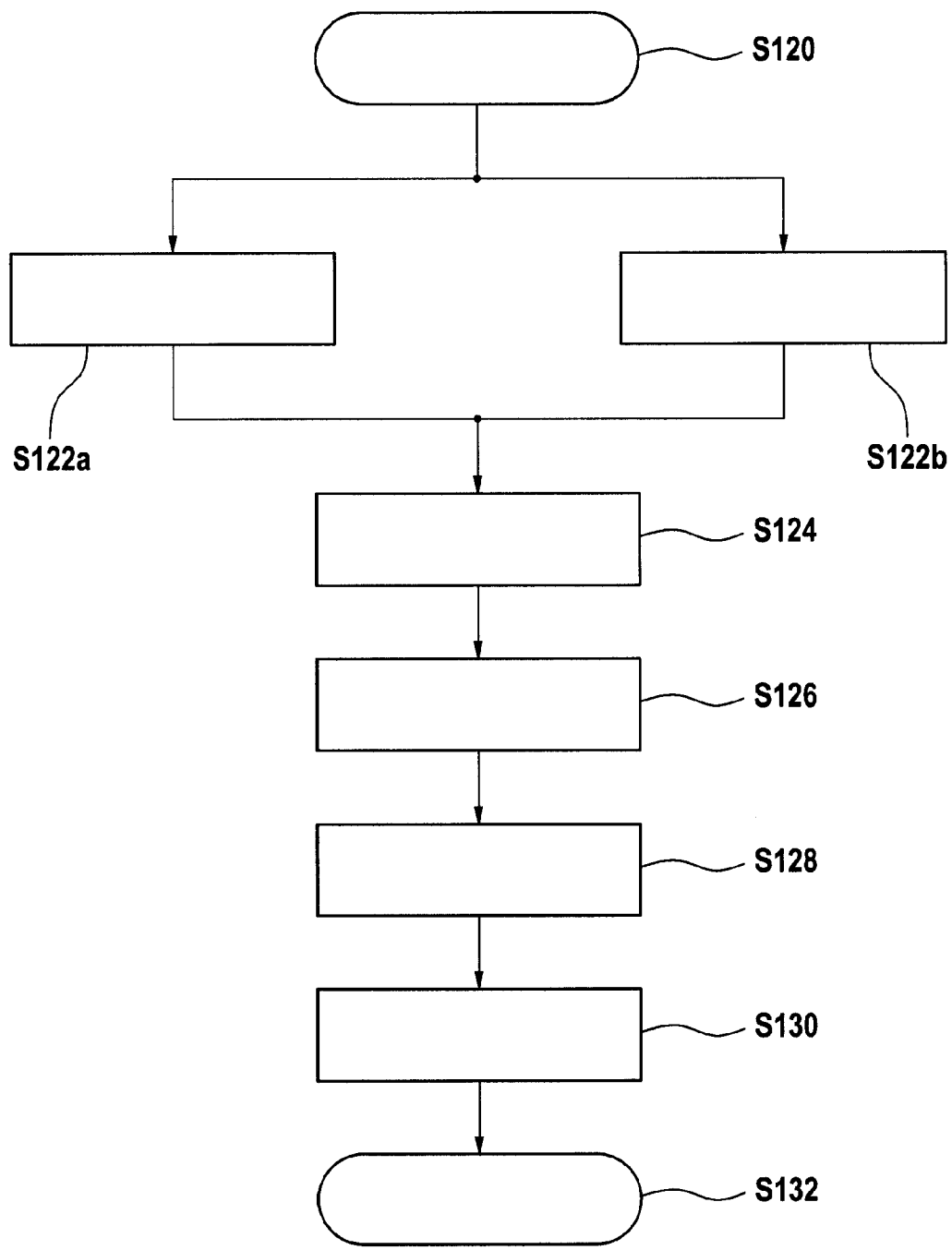
FIG. 11 is a flow chart of a second signalling flow in connection with a method in accordance with the present invention.

FIG. 11 is a flow chart of a second signalling flow in connection with a method in accordance with the present invention. The flow chart of FIG. 11 particularly describes resource lending/borrowing, e.g. for avoiding handover or in case of special radio or traffic conditions (cf. above for cases in which performing a handover may actually be preferred). The method in accordance with the present invention commences with step S120. Then follows a bilateral exchange of information between at least two transmission cells, i.e. the corresponding base stations. Referring back to the example of FIGS. 5, 6, in case of a lending procedure cell 1 transmits a lending request to cell 2 in step S122a. Together with said request, cell 1 specifies sub-carriers or regions for lending to cell 2, e.g. sub-carriers SC8, SC9 (FIG. 5) or region R11 (FIG. 6).

Alternatively, in step S122b cell 2 transmits a borrowing request to cell 1. In said borrowing requests cell 2 specifies sub-carriers or regions for borrowing from cell 1, e.g. sub-carriers SC8, SC9 (FIG. 5) or region R11 (FIG. 6). In connection with said request, current situation of user equipments and/or cell traffic are checked, and a decision against handover and in favour of allocation/partitioning adjustment is taken, as previously described.

Subsequent steps S124 to S130 correspond to previously described method steps S110 to S116 (cf. FIG. 10). This means that said bilateral exchange information is received and stored at the respective other base station in step S124, positions of all first type regions Rij are determined in step S126, positions of all second type regions R'ij are determined in step S128, and each region type is associated with at least one transmission-related characteristic, e.g. a power restriction in step S130. The method terminates with step S132.

Advantageously, in accordance with further embodiments of the present invention, sizes or portions of individual resource regions may be limited with respect to both pre-definition and adaptation. Alternatively or additionally, a portion of resource regions may be limited to a total number of sub-carriers available for OFDM transmission. Furthermore, positions of the resource regions may be fixed.

In this way, the different embodiments in accordance with the present invention advantageously provide for fast resource allocation in conjunction with fast adjustment changing system conditions. These advantages go along with a low required signalling effort due to the described predefinition of resource regions, knowledge of the involved parties about predefinition and adaptation alongside with different possible adaptation modes. In particular, the present invention provides a possible alternative to resource-demanding handover procedures.

The invention claimed is:

1. A method of performing resource allocation in OFDM transmission, comprising the steps of:
performing a partitioning of the OFDM spectrum into a plurality of predefined regions, the plurality of predefined regions comprising a number of first type regions of sub-carriers and a number of second type regions of sub-carriers for a number of OFDM transmission cells;
assigning a first transmit power to the first type regions and a second transmit power to the second type regions, wherein the first transmit power is a higher transmit power than the second transmit power;
allocating said resources for communication of a first given base station with a first associated user equipment in at least one first type region of sub-carriers and with a second associated user equipment in at least one second type region of sub-carriers dependent on the first and second transmit power;
communicating the partitioning and the assigned first and second transmit power to base stations in the OFDM transmission system and to user equipments in operative connection with said base stations; and
borrowing a number of subcarriers in the first regions of a first cell from first regions of a second cell or lending a number of subcarriers from the first regions of the second cell to the first regions of the first cell for a flexible reaction to changing frequency planning, interference conditions, traffic conditions, geographical position, and channel quality, wherein the first cell neighbours the second cell, wherein the first cell has a need for resources in its outer spatial regions, and wherein orthogonality for interference coordination is achieved by first and second type regions being mutually different from each other with respect to the transmit power.

2. The method of claim 1, wherein the partitioning and/or characteristic assignment is requested by an element of an OFDM transmission system.

3. The method of claim 1, wherein the step of partitioning includes assigning equal sizes for all regions of sub-carriers.

4. The method of claim 1, further comprising the step of repartitioning the OFDM spectrum for said number of OFDM transmission cells.

5. The method of claim 1, further comprising the step of shifting assigned characteristics within at least one pair of transmission cells.

6. The method of claim 1, wherein the step of assigning the respective transmission-related characteristic involves assigning a first characteristic to a given region for a given transmission cell and assigning a second characteristic to a corresponding sub-carrier region for the other transmission cells from said number of transmission cells.

7. A base station for use in an OFDM transmission system, comprising:
means for receiving from a central node in said transmission system partitioning data descriptive of a partitioning of the OFDM spectrum into a plurality of predefined regions, the plurality of predefined regions comprising a number of first type regions of sub-carriers and a number of second type regions of sub-carriers for a number of OFDM transmission cells;
means for receiving assignment data descriptive of an assignment of a first transmit power to the first type regions and a second transmit power to the second type regions, wherein the first transmit power is a higher transmit power than the second transmit power;
means for allocating said resources for communication of a given base station with a first associated user equipment in at least one first type region of sub-carriers and with a second associated user equipment in at least one second type region of sub-carriers;
means for communicating the partitioning data and the assignment data to user equipments in operative connection with the base station; and
means for borrowing a number of subcarriers in the first regions of a first cell from first regions of a second cell or lending a number of subcarriers from the first regions of the second cell to the first regions of the first cell for a flexible reaction to changing frequency planning, interference conditions, traffic conditions, geographical position, and channel quality, wherein the first cell neighbours the second cell, wherein the first cell has a need for resources in its outer spatial regions, and wherein orthogonality for interference coordination is achieved by first and second type regions being mutually different from each other with respect to the transmit power.

8. The base station of claim 7, further comprising
means for transmitting and/or receiving an assigned characteristic shifting request to/from at least one other base station; and
means for adapting at least one of said partitioning, assignment, and resource allocation in response to said request.

9. A central node for use in an OFDM transmission system, comprising:
means for receiving from a central node in said transmission system partitioning data descriptive of a partitioning of the OFDM spectrum into a plurality of predefined regions, the plurality of predefined regions comprising a number of first type regions of sub-carriers and a number of second type regions of sub-carriers for a number of OFDM transmission cells;
means for receiving assignment data descriptive of an assignment of a first transmit power to the first type regions and a second transmit power to the second type regions, wherein the first transmit power is a higher transmit power than the second transmit power;
means for allocating said resources for communication of a given base station with a first associated user equipment in at least one first type region of sub-carriers and with a second associated user equipment in at least one second type region of sub-carriers;
means for communicating the partitioning data and the assignment data to user equipments in operative connection with the base station; and
means for borrowing a number of subcarriers in the first regions of a first cell from first regions of a second cell or lending a number of subcarriers from the first regions of the second cell to the first regions of the first cell for a flexible reaction to changing frequency planning, interference conditions, traffic conditions, geographical position, and channel quality, wherein the first cell neighbours the second cell, wherein the first cell has a need for resources in its outer spatial regions, and wherein orthogonality for interference coordination is achieved by first and second type regions being mutually different from each other with respect to the transmit power.

10. A computer program product encoded on a non-transitory computer readable medium for use in an OFDM transmission system comprising program code sequences for implementing:

means for receiving from a central node in said transmission system partitioning data descriptive of a partitioning of the OFDM spectrum into a plurality of predefined regions, the plurality of predefined regions comprising a number of first type regions of sub-carriers and a number of second type regions of sub carriers for a number of OFDM transmission cells;

means for receiving assignment data descriptive of an assignment of a first transmit power to the first type regions and a second transmit power to the second type regions, wherein the first transmit power is a higher transmit power than the second transmit power;

means for allocating said resources for communication of a given base station with a first associated user equipment in at least one first type region of sub-carriers and with a second associated user equipment in at least one second type region of sub-carriers;

means for communicating the partitioning data and the assignment data to user equipments in operative connection with the base station; and means for borrowing a number of subcarriers in the first regions of a first cell from first regions of a second cell or tending a number of subcarriers from the first regions of the second cell to the first regions of the first cell for a flexible reaction to changing frequency planning, interference conditions, traffic conditions, geographical position, and channel quality, wherein the first cell neighbours the second cell, wherein the first cell has a need for resources in its outer spatial regions, and wherein orthogonality for interference coordination is achieved by first and second type regions being mutually different from each other with respect to the transmit power;

when being executed on data processing means in a base station of the OFDM transmission system.

* * * * *